(12) United States Patent
Asano et al.

(10) Patent No.: US 8,523,120 B2
(45) Date of Patent: Sep. 3, 2013

(54) COMPONENT SUPPORT DEVICE AND CONSTRUCTION MACHINE WITH COMPONENT ATTACHED VIA THE SAME

(75) Inventors: Yasuhiro Asano, Komatsu (JP); Naohisa Iwasawa, Hirakata (JP); Yuji Terasaka, Hirakata (JP)

(73) Assignee: Komatsu Ltd., Tokyo (JP)

( * ) Notice: Subject to any disclaimer, the term of this patent is extended or adjusted under 35 U.S.C. 154(b) by 1280 days.

(21) Appl. No.: 11/151,381

(22) Filed: Jun. 13, 2005

(65) Prior Publication Data

US 2006/0043243 A1  Mar. 2, 2006

(30) Foreign Application Priority Data

Jun. 14, 2004  (JP) ................. 2004-175059

(51) Int. Cl.
*F16L 3/22* (2006.01)
(52) U.S. Cl.
USPC ............. 248/68.1; 248/65; 248/73; 248/637; 414/722; 37/397
(58) Field of Classification Search
USPC .............. 248/68.1, 49, 65, 73, 300, 222.51, 248/58, 637, 643, 642, 651, 674, 205.1, 220.21, 248/220.22, 309.1; 414/722, 727; 212/347; 37/397, 466; 52/732.1, 839
See application file for complete search history.

(56) References Cited

U.S. PATENT DOCUMENTS

| | | | |
|---|---|---|---|
| 4,304,077 A * | 12/1981 | Muller | 52/115 |
| 4,391,341 A * | 7/1983 | Taghon | 180/9.1 |
| 4,397,481 A * | 8/1983 | Dion et al. | 280/781 |
| 6,098,942 A | 8/2000 | Heath | |
| 6,250,681 B1 * | 6/2001 | Takahashi et al. | 280/805 |
| 6,758,024 B1 * | 7/2004 | Mieger et al. | 52/839 |
| 6,848,522 B2 * | 2/2005 | Moore et al. | 180/9.1 |
| 6,945,735 B1 * | 9/2005 | Doverspike | 405/184.4 |
| 7,458,633 B2 * | 12/2008 | Takeuchi et al. | 296/204 |

FOREIGN PATENT DOCUMENTS

JP  5-196176 A  8/1993

OTHER PUBLICATIONS

Applicants Admitted Prior Art (AAPA) as identified by figure 9 of the drawings and pp. 1, and 12-13.*
Applicants Admitted Prior Art (AAPA) as identified by Figure 9 of the drawings, and p. 1, and 12-13 of the specification.*

* cited by examiner

*Primary Examiner* — Todd M. Epps
(74) *Attorney, Agent, or Firm* — Holtz, Holtz, Goodman & Chick, PC

(57) ABSTRACT

A component support device (7) that attaches components (61, 62) on a working structure (41) of a construction machine is formed by bending a plate along at least two bending lines, the component support device (7) including a support (711) formed at a center portion between the two bending lines for supporting the components (61, 62), and a pair of attachment legs (712, 713) formed at both sides of the support (711) to be fixed on the working structure (41), in which at least one of the pair of attachment legs (712, 713) is split into a plurality of portions at a portion to be fixed on the working structure (41), and rigidity of the attachment leg (712, 713) against a bending line direction is less than rigidity of the support (711) in the bending line direction.

4 Claims, 11 Drawing Sheets

COMPONENT SUPPORT DEVICE AND CONSTRUCTION MACHINE WITH COMPONENT ATTACHED VIA THE SAME

BACKGROUND OF THE INVENTION

1. Field of the Invention

The present invention relates to a component support device and a construction machine with a component attached via the component support device.

2. Description of Related Art

A hydraulic excavator, which is a construction machine, has an upper swiveling body on a lower traveling body, a working equipment being consecutively arranged to the upper swiveling body.

The working equipment includes a boom swingably provided on the upper swiveling body, an arm swingably provided at a tip end of the boom, and a bucket rotatably provided at a tip end of the arm. The boom, the arm and the bucket are driven by a boom cylinder arranged on the upper swiveling body, an arm cylinder arranged on the boom and a bucket cylinder arranged on the arm, so that the boom, the arm and the bucket can swing as pressure oil is supplied to these cylinders.

Therefore, hydraulic piping is arranged on the working equipment for supplying the pressure oil to these cylinders via a piping support device provided on the boom or the arm.

As the above piping support device, one using a screw fitting base for fitting piping has been conventionally known (for example, see Reference: JP05-196176A).

The screw fitting base for fitting piping is formed by an approximate square plate, which is, for instance, fixed on an outer surface of the boom by welding. At this time, the welding of the screw fitting base is carried out on the whole circumference. And the screw fitting base is arranged in a direction so that a weld bead toe to which a stress is likely concentrated corresponds to a portion with a low nominal stress.

However, according to the screw fitting base for fitting piping disclosed in Reference, the welding has to be carried out on the whole circumference, requiring a time for assembly.

Additionally, when a portion with the screw fitting base for fitting piping fixed is deformed due to an excavation operation etc. of the working equipment, an excessive stress is concentrated at a welding portion because the screw fitting base resists the deformation, even when the direction of the weld bead toe to which the stress is likely concentrated corresponds to the portion with the low nominal stress. This may result in fatigue fracture on the welding portion.

In order to avoid the fatigue fracture, an installation portion is restricted to a portion with less deformation, and the installation portion is reinforced. However, if the installation portion is restricted, the piping cannot be arranged by the most direct way, and the piping must be curved unnecessarily.

Further, the length of the piping increases, which shortens the life of the piping as an unwanted external force acts on the piping. Furthermore, when the installation portion is reinforced, components for reinforcement and work processes for assembly increase, thus increasing the cost.

SUMMARY OF THE INVENTION

An object of the present invention is to provide a construction machine as well as a component support device that can stably be installed without reinforcement even at a portion where a high stress is generated, in which a component can be arranged at the best position with less restriction.

A component support device according to an aspect of the present invention attaches a component on a working structure of a construction machine, the component support device being formed by bending a plate along at least two bending lines. The component support device includes: a support formed at a center portion between the two bending lines for supporting the component; and a pair of attachment legs formed on both sides of the support to be fixed on the working structure, in which at least one of the pair of the attachment legs is split into a plurality of portions at a portion to be fixed on the working structure, and rigidity of the attachment leg in a bending line direction is less than rigidity of the support against the bending line direction.

A construction machine according to another aspect of the present invention is equipped with a working structure, a component being attached on the working structure via a component support device, the component support device being formed by bending a plate along at least two bending lines. The component support device includes: a support formed at a center portion between the two bending lines for supporting the component; and a pair of attachment legs formed on both sides of the support to be fixed on the working structure, in which at least one of the pair of the attachment leg is split into a plurality of portions at a portion to be fixed on the working structure, and rigidity of the attachment legs against a bending line direction is less than rigidity of the support against the bending line direction.

In the above-described component support device and the construction machine according to an aspect and another aspect of the present invention, since the portion of the attachment leg to be fixed on the working structure is split into the plurality of portions, the rigidity of the attachment leg against the bending line direction is less than the rigidity of the support, so that the attachment leg of the component support device is likely deformed. Consequently, even when the component support device is installed (fixed) at the portion of the working structure likely deformed, the stress hardly concentrates on the joint because the attachment leg is deformed along with the deformation of the installation portion. Therefore, the installation portion of the component support device will not be restricted, thus being arranged at the best position for the piping. Even when the installation portion is a portion generating high stress, the installation portion need not be reinforced.

In the component support device, since the support and the attachment legs are formed by bending the plate along the bending lines, the support and the attachment legs are integrally formed, and consequently, the width and the length thereof can be enlarged in some measure, thus assuring the rigidity thereof against the external force or the like acting due to vibration of the piping when supporting the hydraulic piping etc. Thus, the stability can be enhanced when supporting the component by the component support device.

Preferably, in the construction machine according to the above aspect of the present invention, the component support device may be fixed on the working structure so that the bending line extends in a direction orthogonal to a force acting direction of a force acting against the working structure.

According to the above arrangement, since the component support device is fixed on the working structure such that the bending line extends in the direction orthogonal to the force acting direction, the force acting on the working structure, the large force acting on the working structure can be absorbed with the bending part bending about the bending line, so that the force acting on the component provided on the support is reduced, thus further reducing the influence on the component provided on the support.

Preferably, in the construction machine according to the above aspect of the present invention, the attachment leg may include a plurality of split leg pieces, and each of the leg pieces may be jointed to the working structure at a position other than a stress-concentrating position of the working structure.

According to the above arrangement, since the leg piece of the attachment leg is jointed to the working structure at the position other than the stress position, the stress will not be concentrated at the joint portion by welding or the like of the attachment leg, thus preventing the joint portion from being damaged.

Preferably, in the construction machine according to the above aspect of the present invention, the working structure may be a working equipment of the construction machine.

According to the above arrangement, in the working equipment of the construction machine, since the large force acts on the working structure of the working equipment due to an excavation operation etc., the working equipment can apply this arrangement preferably.

Preferably, in the construction machine according to the above aspect of the present invention, the component support device may support a piping component for supplying pressure oil to the working equipment.

According to the above arrangement, in the working equipment such as the hydraulic excavator operated by the pressure oil, since the pressure oil must be supplied to a cylinder etc. and the piping component is arranged mostly along the working structure of the working equipment, the influence of the force acting on the working structure can be minimized against the piping component by employing the present invention, thus surely preventing the piping component from being damaged.

DETAILED DESCRIPTION OF PREFERRED EMBODIMENT(S)

An embodiment of the present invention will be described below with reference to attached drawings.

[1. Entire Configuration of Construction Machine]

Figure 1:
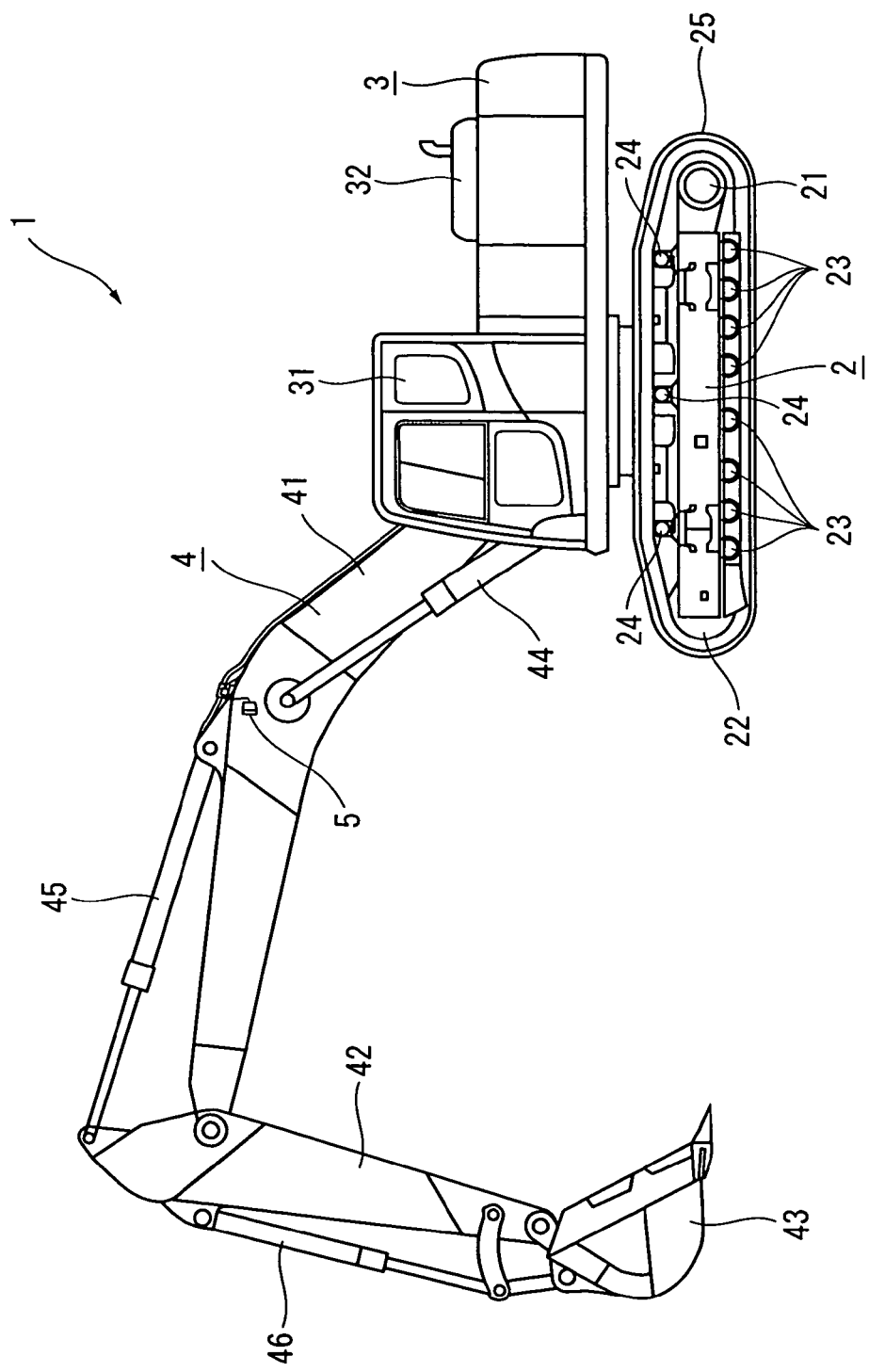
FIG. 1 is a side elevation showing the configuration of a construction machine according to an embodiment of the present invention.

In FIG. 1, a hydraulic excavator 1 is shown as a construction machine according to the embodiment of the present invention. The hydraulic excavator 1 is a construction machine performing various works such as excavation, rolling compaction, and earth and sand loading, the hydraulic excavator 1 including a lower traveling body 2, an upper swiveling body 3 and a working equipment 4.

The lower traveling body 2 includes a pair of traveling devices 20 extending along a vehicle traveling direction. Each of the traveling devices 20 includes a driving wheel 21, an idle wheel 22, a lower road wheel 23, an upper road wheel 24 and a crawler belt 25 wound around these wheels.

The upper swiveling body 3 defines a vehicle main body of the hydraulic excavator 1, which is rotatably provided on the lower traveling body 2 and includes a cab 31 provided substantially at the center of the vehicle, an engine 32 provided on the rear side of the vehicle and a hydraulic circuit (not shown) driven by the engine 32.

The working equipment 4 swingably projects from a lateral side of the cab 31 of the upper swiveling body 3 and has a boom 41, an arm 42 and a bucket 43 as working structures.

The boom 41 is a steel product with the intermediate portion thereof bending downward, a base end thereof being swingably supported by the upper swiveling body 3. A tip end of a boom cylinder mechanism 44 is rotatably connected to a lateral surface of a bending portion of the boom 41, and a base end of the boom cylinder mechanism 44 is swingably supported by the upper swiveling body 3. Incidentally, a light 5 for night work is provided on the lateral surface of the bending portion of the boom 41.

The arm 42 is a substantially linear steel product, a base end thereof being swingably supported by a tip end of the boom 41. A tip end of an arm cylinder mechanism 45 is rotatably connected to a base end of the arm 42, and a base end of the arm cylinder mechanism 45 is swingably supported by an upper surface of the bending portion of the boom 41.

The bucket 43 is a steel box with a substantially semicircular lateral surface, an end of a subtense of the semicircle being swingably supported by a tip end of the arm 42 and the other end of the subtense having an excavation claw. A tip end of a bucket cylinder mechanism 46 is rotatably connected to the outer periphery of the box of the bucket 43, and a base end of the bucket cylinder mechanism 46 is swingably supported by an upper surface on a base end side of the arm 42.

The working equipment 4 can work when variously changing the position and the posture of the bucket 43 since pressure oil is supplied from the hydraulic circuit of the above-described upper swiveling body 3.

Specifically, a piston of the boom cylinder mechanism 44 is extended/contracted and the boom 41 swings vertically when the pressure oil is supplied to the boom cylinder mechanism 44, a piston of the arm cylinder mechanism 45 is extended/contracted and the arm 42 swings against the boom 41 when the pressure oil is supplied to the arm cylinder mechanism 45, and a piston of the bucket cylinder mechanism 46 is extended/contracted and the bucket 43 is rotated against the arm 42 when the pressure oil is supplied to the bucket cylinder mechanism 46. A combination of these operations enables to perform excavation, loading or the like by positioning the bucket 43 in various postures.

[2. Configuration of Component Support Device]

Figure 2:
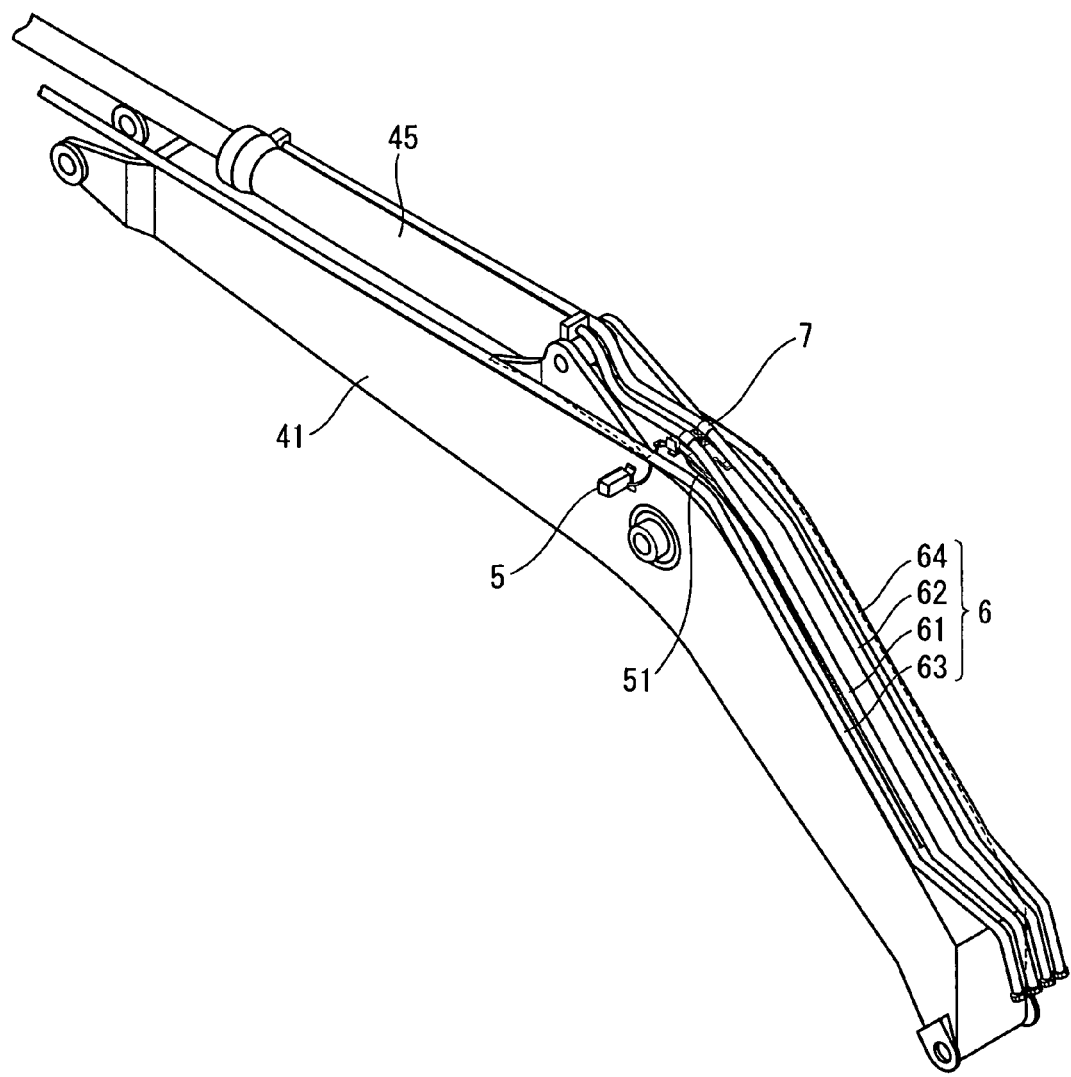
FIG. 2 is a fragmentary perspective view showing the configuration of a working equipment of the construction machine of the aforesaid embodiment.

As described above, since the working equipment 4 is driven by supplying the pressure oil to the boom cylinder mechanism 44, the arm cylinder mechanism 45 and the bucket cylinder mechanism 46, a hydraulic piping 6 is provided on the working equipment 4 for supplying the pressure oil to these cylinder mechanisms as shown in FIG. 2, and piping components 61 and 62 of the hydraulic piping 6 are supported by a piping support structure 7 as a component support device.

In the boom 41, a power wire 51 for supplying power to the above-described light 5 is arranged along the hydraulic piping 6, the power wire 51 also being supported by the piping support structure 7.

(1) Configuration of Piping Support Structure 7

(1-1) Brief Configuration

The hydraulic piping 6 includes flexible piping components 61 to 64, which is deformable along with the movement of the boom 41 and the arm 42, but is restricted in movement at connecting portion with the arm cylinder mechanism 45 by the piping support structure 7 provided at the bending portion of the boom 41 so that the piping components are not released.

The piping component 61 is a piping for supplying the pressure oil in a direction in which the piston of the arm cylinder mechanism 45 is extended, and the piping component 62 is a piping for supplying the pressure oil in a direction in which the piston of the arm cylinder mechanism 45 is contracted.

And the piping component 63 is a piping for supplying the pressure oil in a direction in which the piston of the bucket cylinder mechanism 46 is extended, and the piping component 64 is a piping for supplying the pressure oil in a direction in which the piston of the bucket cylinder mechanism 46 is contracted. Though not shown, these piping components 63 and 64 are also supported on the upper surface of the base end of the arm 42 by the same piping support structure 7.

Figure 3:
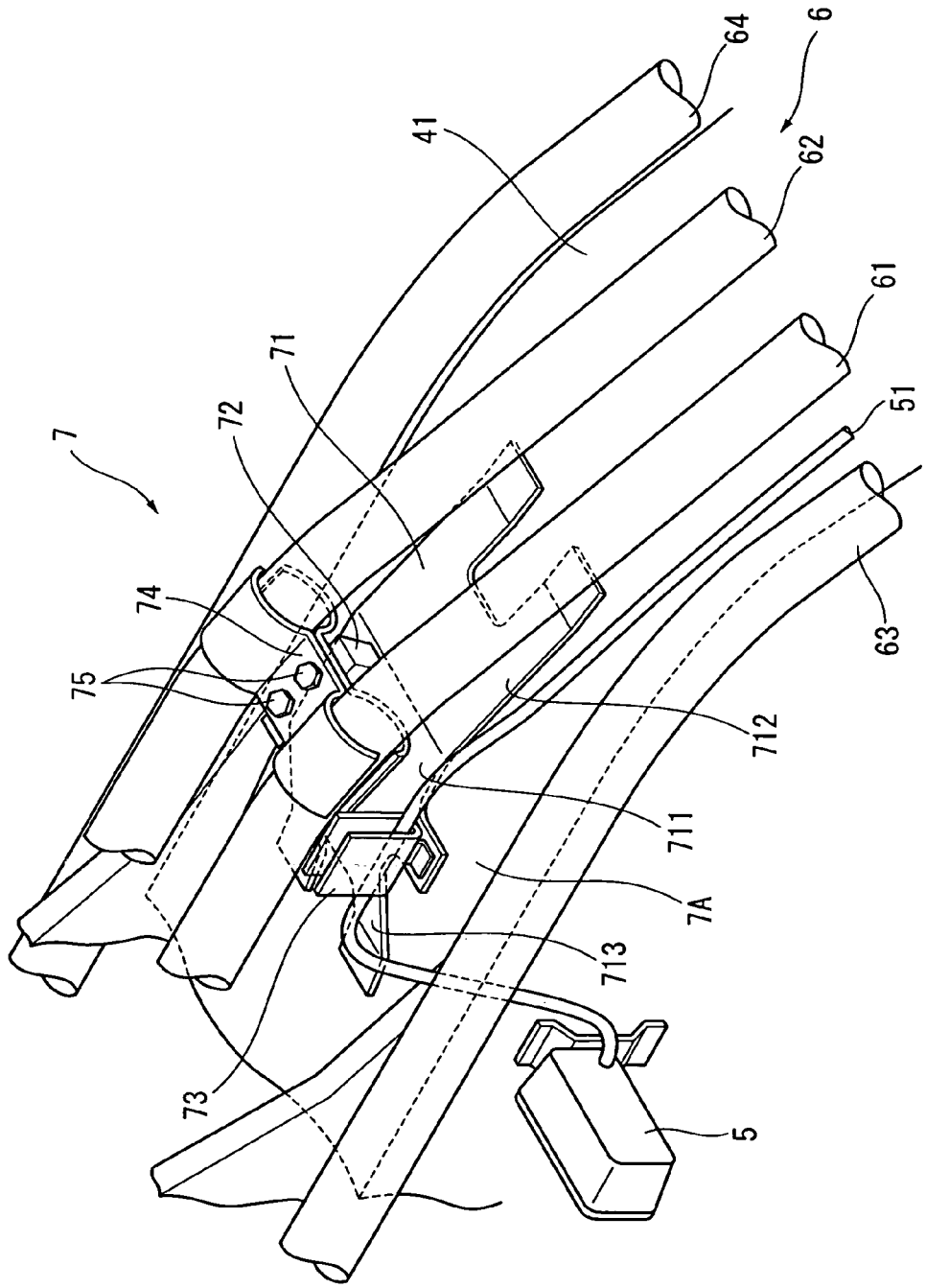
FIG. 3 is a perspective view briefly showing the configuration of a component support device of the aforesaid embodiment.

As shown in FIG. 3, the piping support structure 7 includes a piping support 71 fixed on an installation portion 7A, a piping attachment 72 consecutively arranged to the piping support 71, and a power wire attachment 73 provided beside the piping attachment 72. A metal fitting 74 is attached to the piping attachment 72, and thus the piping components 61 and 62 are fixed on the piping support structure 7 as the metal fitting 74 is attached to the piping attachment 72 by screw bolts 75.

(1-2) Configuration of Piping Support 71

As shown in FIGS. 4 to 7, the piping support 71 is formed as a metallic angular part in side view with the center projected by bending a rectangular metal plate at two bending lines B along shorter sides of the rectangle. The piping support 71 has a support 711 for receiving the piping attachment 72 to support the piping, and a pair of attachment legs 712 and 713 extending from both ends of the support 711 in order to support the support 711 with a space apart from the installation portion 7A.

The support 711 is a substantially rectangular portion between the two bending lines B and formed with a side projection 711A substantially at the center of the support 711, the side projection 711A projecting in a direction of the bending line B.

The attachment legs 712 is a portion outside one of the bending lines B, and has a substantially U-shaped cutting portion 712A formed at the center in a longitudinal direction of the rectangle extending toward the support 711 from an end in the longitudinal direction. A bending portion near the end in the longitudinal direction of the attachment leg 712 bending in a direction opposite to the bending line B and split by the cutting portion 712A defines two split legs 712B, the piping support 71 being fixed on the boom 41 by the split legs 712B.

The attachment legs 713 are portions outside the other one of the bending lines B, and have a cutting portion 713A and split legs 713B in the same manner as the attachment leg 712.

Figure 6:
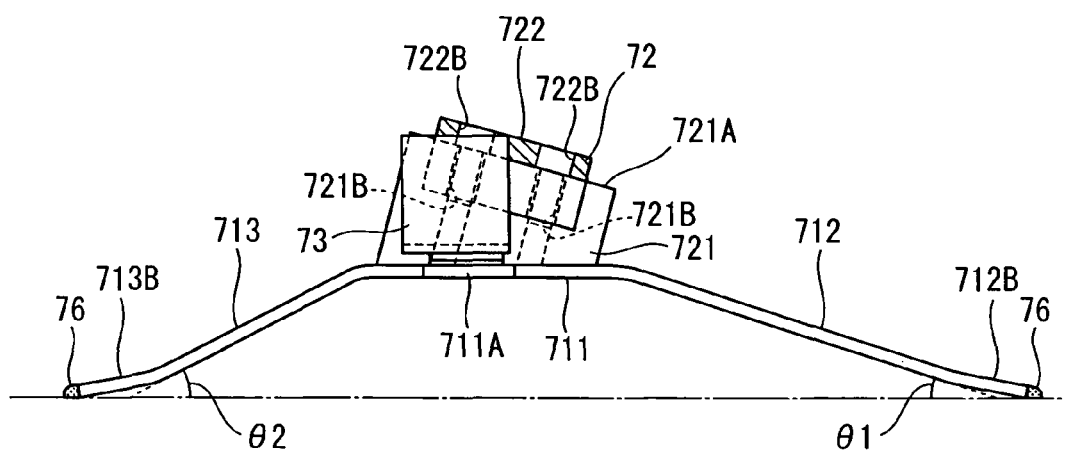
FIG. 6 is a side elevation showing the configuration of the component support device of the aforesaid embodiment.

The attachment leg 712 is different from the attachment leg 713 in the length and the bending angle against the support 711, the length in the longitudinal direction of the attachment leg 712 is greater than that of the attachment leg 713. In particular, as shown in FIG. 6, if a tilt angle θ1 defined by the attachment leg 721 and the installation surface of the installation portion 7A is about 20 degrees for instance, a tilt angle θ2 defined by the attachment leg 713 and the installation surface is about 30 degrees, which is greater than the tilt angle θ1.

(1-2) Configuration of Piping Attachment 72

The piping attachment 72 includes a base 721 attached to the support 711 of the piping support 71, and a support piece 722 supported by the base 721.

The base 721 is formed by a rectangular parallelepiped block with the installation surface 721A on which the support piece 722 is installed forming a tilt surface, the base 721 being fixed on the support 711 of the piping support 71 by welding or the like.

Figure 7:
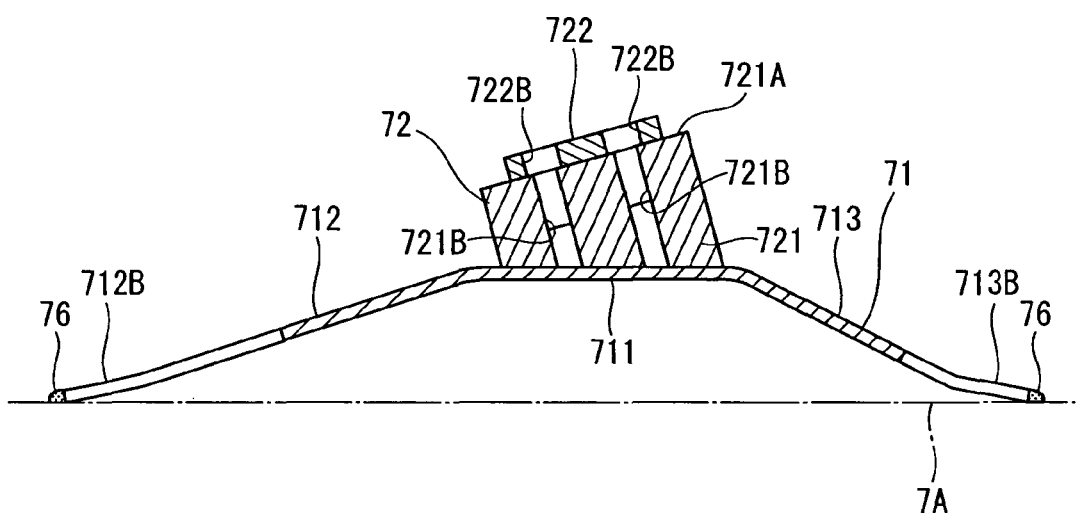
FIG. 7 is a cross-section showing the configuration of the component support device of the aforesaid embodiment.

The installation surface 721A is inclined such that the piping support 71 becomes higher on the attachment leg 713 side while becomes lower on the attachment leg 712 side. As shown in FIGS. 6 and 7, two screw holes 721B are formed on the installation surface 721A of the base 721 in a normal line direction of the installation surface 721A toward the lower piping support 71, to each of which the screw bolts 75 for fixing the above-described metal fitting 74 are screwed.

Figure 5:
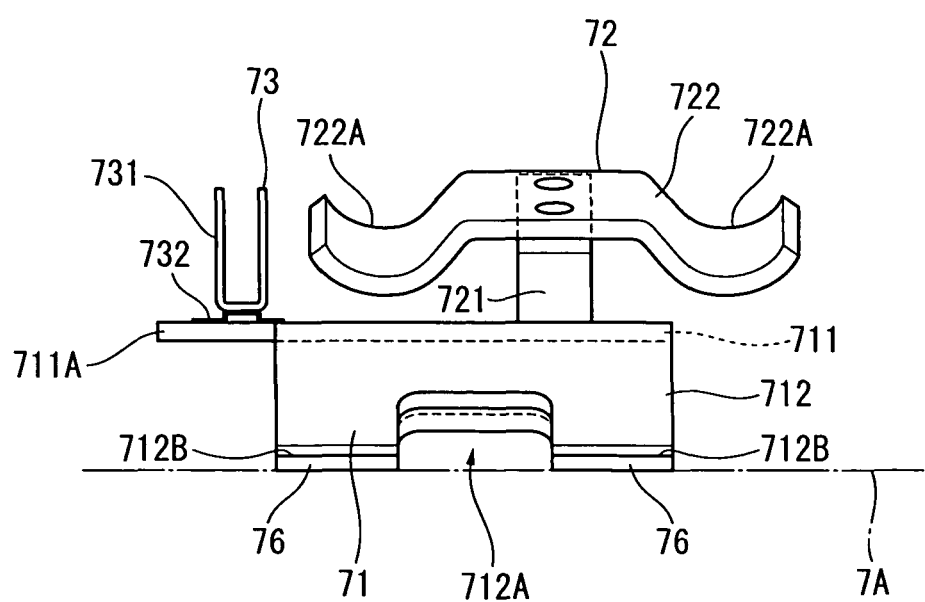
FIG. 5 is a rear view showing the configuration of the component support device of the aforesaid embodiment.

As shown in FIG. 5, the support piece 722 is a metallic wavy part with recesses 722A substantially arcuate in side view formed on the both ends in a width direction orthogonal to the piping components 61 and 62 to be attached. As shown in FIGS. 6 and 7, two through holes 722B are formed at a flat portion substantially at the center in the width direction of the support piece 722.

The support piece 722 is disposed so that the through holes 722B are superposed onto the screw holes 721B of the base 721, and is fixed on the installation surface 721A of the base 721 by welding.

(1-3) Configuration of Power Wire Attachment 73

As shown in FIGS. 3 and 5, the power wire attachment 73 includes a main body 731 formed of a metallic plate by bending in a U-shape, and a base 732 provided on the bottom surface of the U-shape of the main body 731. The power wire 51 is inserted to the hollow of the U-shape of the main body 731 in a loosely fitted manner.

As shown in FIG. 5, the base 732 is a metallic part formed by bending such that the center thereof projects, and the both ends thereof are connected to the upper surface of the side projection 711A of the support 711 by welding.

(1-4) Fixture of Piping Support Structure 7

The piping support structure 7 having such configuration is fixed on the bending portion of the boom 41. More specifically, as shown in FIG. 3, the piping support structure 7 is disposed such that the longer side of the piping support 71 comes along a direction toward the tip end side (leftward in FIG. 3) of the boom 41 from the base end side (rightward in FIG. 3). At this time, the longer attachment leg 712 of the piping support 71 is disposed on the base end side of the boom 41 while the shorter attachment leg 713 is disposed on the tip end side of the boom 41.

Figure 4:
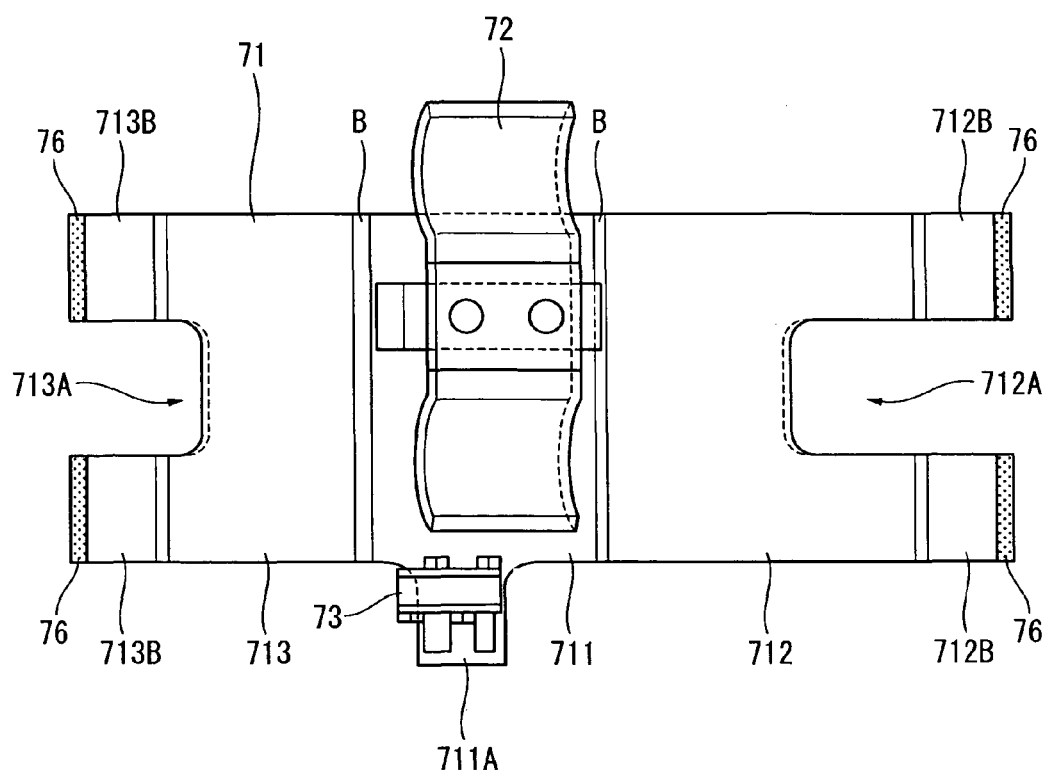
FIG. 4 is a plan view showing the configuration of the component support device of the aforesaid embodiment.

As shown in FIGS. 4 and 5, fillet welding is carried out between end surfaces of the split legs 712B, 713B of the attachment legs 712, 713 and the installation surface of the installation portion 7A, so that the piping support structure 7 is fixed on the installation portion 7A located on the upper surface of the boom 41 via the fillet welding 76.

Since the piping support structure 7 is arranged in such direction and fixed on the installation portion of the boom 41, the installation surface 721 A of the piping attachment 72 becomes higher on the tip end side of the boom 41 while becomes lower on the base end side, and accordingly, the support piece 722 to be fixed on the upper surface is also slanted.

Because of this arrangement of the piping attachment 72, the piping components 61 and 62 are fixed in a slanted manner so that the base end side thereof comes closer to the upper surface of the boom 41 while the tip end side thereof goes away from the upper surface of the boom 41.

(2) Attaching Arrangement of Light 5

Figure 8:
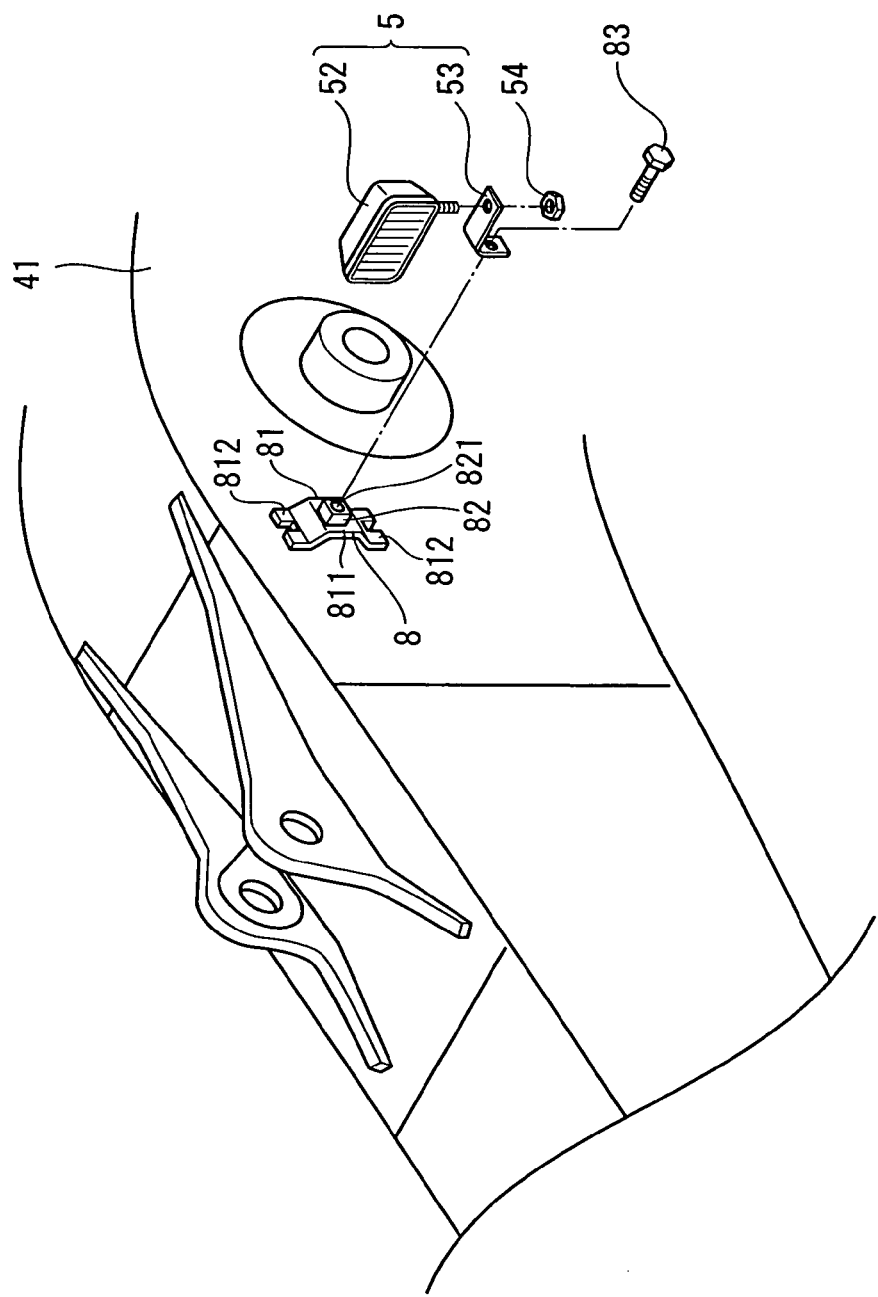
FIG. 8 is an exploded perspective view showing the configuration of the component support device that supports other components of the aforesaid embodiment.

As shown in FIG. 8, the light 5 provided on the lateral surface of the boom 41 includes a light source 52 and a bracket 53, which are integrally arranged by inserting a male screw of the light source 52 into a hole formed in the L-shaped bracket 53, and screwing a nut 54 to the male screw.

The light 5 is attached via the component support structure 8 (component support device) provided on the lateral surface of the boom 41, the component support structure 8 including a component support 81 and a component attachment 82 like the piping support structure 7.

The component support 81 has, as similar to the piping support 71, an angular profile in which a metallic rectangular plate is bent at two positions along a shorter side direction, the highest point of the angular profile between the bending lines defining a support 811 and both sides thereof defining attachment legs 812. Besides, a cutting portion is formed in each of the attachment legs 812 and joints to the boom 41 define split legs. Note that, the component support 81 is different from the piping support 71 in that the attachment legs 812 of the support 811 have the same length and their bending angles relative to the bending lines are the same.

The component attachment 82 is substantially formed by a rectangular parallelepiped block, which is connected to the support 811 of the component support 81 by welding. A screw hole 821 is formed on a surface opposite to the joint surface. The screw bolt 83 is screwed into the screw hole 821, so that the bracket 53 of the light 5 is fixed to the component attachment 82.

The component support structure 8 is arranged such that a direction orthogonal to the extending direction of the boom 41 becomes a longitudinal direction of the component support 81, in other words, the component support structure 8 is arranged in a vertical direction of the lateral surface of the boom 41, and fixed between end surfaces of the split legs of the component support 81 and the lateral surface of the boom 41 by fillet welding in the same manner as the piping support structure 7.

[3. Actions and Advantages of Embodiment]

Next, Actions and advantages of the present embodiment will be described.

(3-1) Actions of Embodiment

According to the hydraulic excavator 1 with such configuration, a reaction force is generated when the bucket 43 collides against the ground as the working equipment 4 is operated for excavation or the like, the reaction force acts on the boom 41 via the arm 42. While a force acts on the upper surface of the bending portion of the boom 41 in a compressive direction or a tensile direction along the extending direction of the boom 41 and a bending force acts on the lateral surface thereof in the vertical direction, the piping support structure 7 and the component support structure 8 absorb these forces to prevent the piping components 61, 62 and the light 5 from the action of these forces.

To be more specific about this, comparison with a conventional piping support structure is carried out through a simulation, and will be described below.

Figure 9:
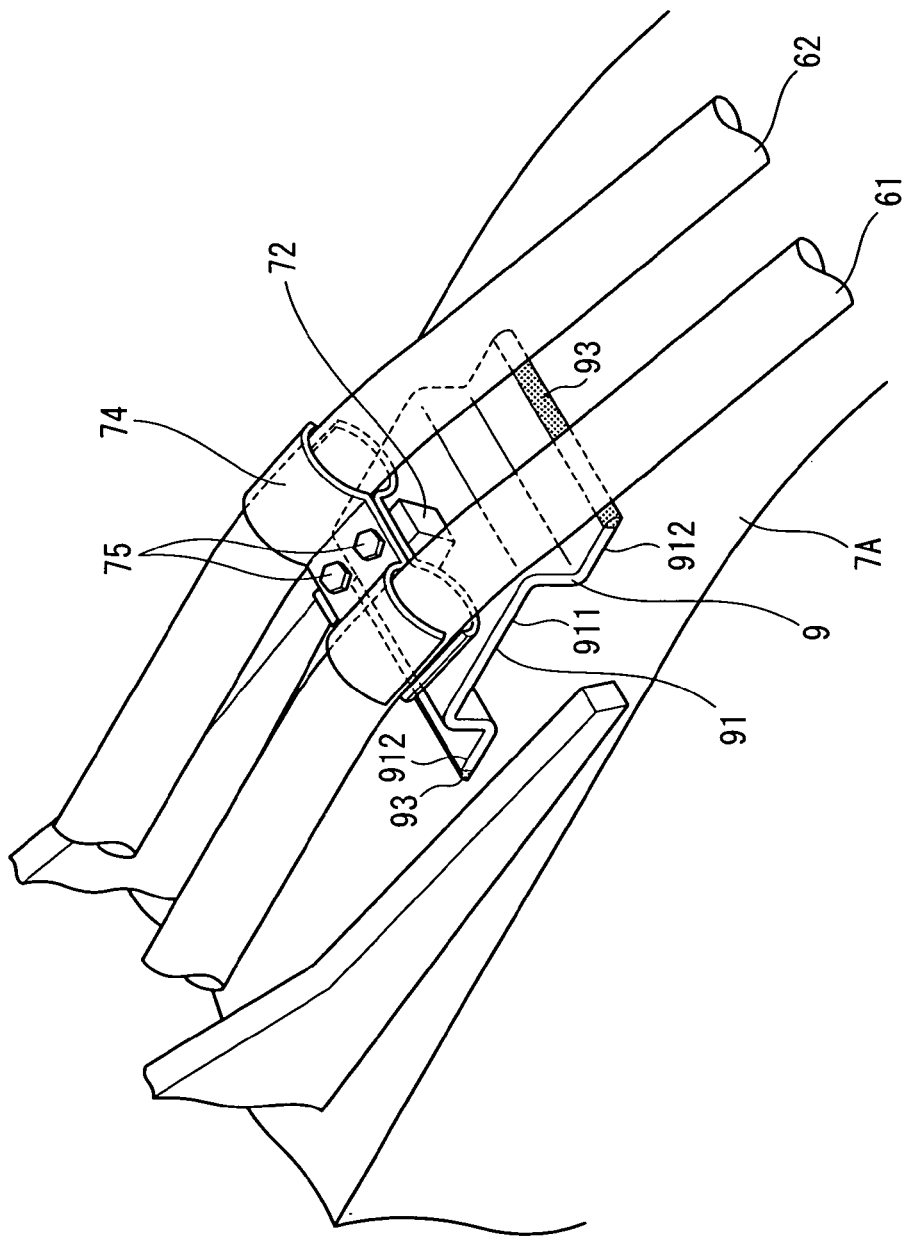
FIG. 9, which shows prior art, is a perspective view briefly showing the configuration of a conventional component support device.

As shown in FIG. 9, which shows prior art, a conventional piping support structure 9 includes a piping support 91 and the piping attachment 72 similar to the above-described piping support structure 7, the piping components 61 and 62 being fixed by the metal fitting 74 and the screw bolt 75.

The piping support 91 is formed by bending a metallic rectangular plate in a rectangular wave profile, defining the higher portion of the rectangular wave profile as a support 911 and the lower portions as attachment legs 912.

Unlike the piping support 71 according to the embodiment, a cutting portion is not formed in the attachment legs 912. These attachment legs 912 are linearly connected by welding on the installation surface of the installation portion 7A by interposing a fillet welding 93 between the tip end surfaces of the legs and the installation surface of the installation portion 7A.

Figure 10A:
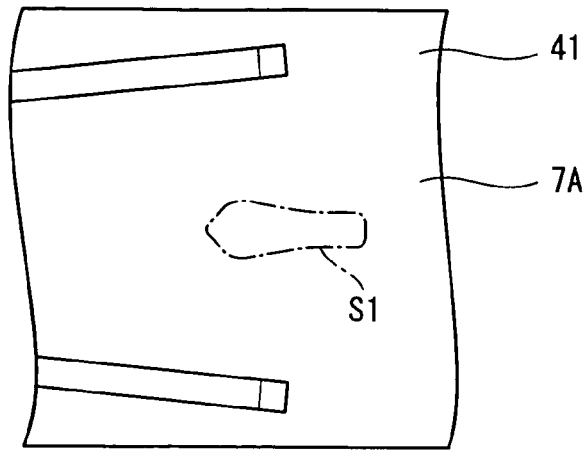
FIGS. 10A to 10C are schematic illustrations each comparing the action of the conventional component support device with the action of the component support device of the present embodiment.

Simulations are carried out about the stresses generated when no piping support is attached, when the conventional piping support structure 9 is attached, and when the piping support structure 7 according to the embodiment is attached to the installation portion 7A which is the upper surface of the bending portion of the boom 41. As a result, when no piping support is provided, stress distribution will be the one shown in FIG. 10A, in which there is a region S1 where the stress is concentrated substantially at the center.

Figure 10B:
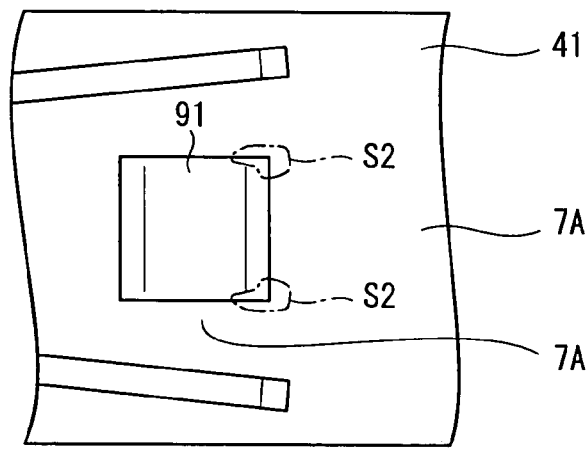

When the conventional piping support 91 is provided, stress distribution will be the one shown in FIG. 10B, in which there is a region S2 where the excessive stress is concentrated at the ends in the width direction of the fillet welding of the piping support 91 against the installation portion 7A.

Figure 10C:
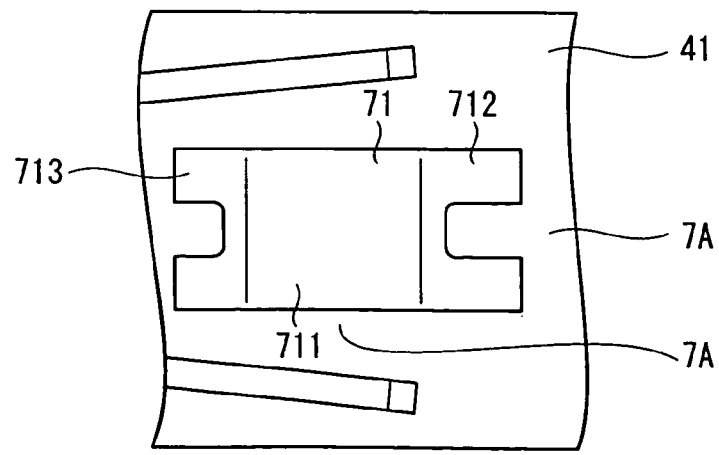

When the piping support 71 according to the present embodiment is attached, stress distribution will be the one shown in FIG. 10C, in which stress concentration is hardly recognized at the fillet welding. In the piping support structure 7 according to the present embodiment, the stress concentrating position appeared on the surface of the installation portion 7A is hidden by the piping support 71 but is located at the support 711 spaced apart from the installation portion 7A, so that the split legs 712B, 713B are jointed to the position of the installation portion 7A other than the stress concentrating position.

(3-2) Advantages of Embodiment

Since partial loss of area exists in the width direction (in the direction of the bending line B) of the attachment legs 712 and 713 because the cutting portions 712A and 713A are formed in the attachment legs 712 and 713 of the piping support 71, the rigidity thereof can be smaller than that of the support 711 in the width direction.

To be more specific, the attachment legs 712 and 713 of the piping support 71 are likely deformed, and therefore, even if the piping support structure 7 is fixed on the installation portion 7A easily deformable, the attachment legs 712 and 713 of the piping support 71 are deformed along with the deformation of the installation portion 7A, so that the stress is hardly concentrated on the fillet welding 76.

Owing to this, even when the piping support structure 7 is fixed on the installation portion 7A easily deformable, the fillet welding 76 hardly results in fatigue fracture, thus stably supporting the piping components 61 and 62.

That is, the position of the installation portion 7A of the piping support structure 7 will not be restricted and the piping components 61 and 62 can be arranged at the most suitable positions, the piping components 61 and 62 will not unnecessarily be curved, the piping will not interfere with the working equipment 4 in swinging, and unwanted external force will not act on the piping components 61 and 62. Therefore, the working equipment 4 can smoothly be swung and the lives of the piping components 61 and 62 can be extended.

Since it is not required to unnecessarily extend the piping components 61 and 62, the lengths of the piping components 61 and 62 will not be increased, thereby lowering the cost.

The installation portion 7A need not be reinforced even when the installation portion 7A is the portion with the high stress generating, thereby reducing the number of components, lowering the cost, and shortening the time for assembly by reducing the worker-hour.

In the piping support 71, since the support 711 and the attachment legs 712 and 713 are formed by bending the plate along the bending lines B, the support 711 and the attachment legs 712 and 713 are integrally formed, and consequently, the width and the length thereof can be kept in some measure, thus assuring the rigidity thereof against the external force acting due to vibration of the piping.

Owing to this, the stability of the piping support by the piping support structure 7 can be enhanced. Additionally, the rigidity is lowered by the provision of the cutting portions 712A and 713A in the attachment legs 712 and 713, thus easily forming the low rigidity portion, and consequently, simplifying the whole structure. Thus, the piping support structure 7 can easily be configured with the low cost.

Since the installation portion 7A is the bending portion of the boom 41 of the construction machine, the installation portion 7A is likely deformed if the excavation is operated by the working equipment 4 using the hydraulic excavator 1. However, even if the installation portion 7A is deformed, since the rigidity of the attachment legs 712 and 713 of the piping support 71 (rigidity against the direction of the bending line B) is low, the attachment legs 712 and 713 can follow the deformation, thus preventing the fatigue fracture of the fillet welding 76 effectively. Accordingly, the piping support structure 7 becomes the optimum support structure for the hydraulic excavator 1, so that the hydraulic piping which is used for swinging the working equipment 4 can stably be supported for long periods.

Since the light 5 is supported by the component support structure 8, even when the bending force acts on the boom 41, the component support structure 8 can absorb and reduce the force as similar to the piping components 61 and 62, the force acting on the boom 41 will not affect the light 5, thus the light 5 being supported stably without damage.

Since the bending line B is formed in the piping support 71 along the direction orthogonal to the compressive/tensile force acting on the boom 41, the force acting on the boom 41 in that direction can be absorbed and reduced by the bending portion, thus further stably supporting the piping components 61 and 62. Similarly, since the bending line is formed in the component support 81 along the direction orthogonal to the direction to which the bending force acts on the lateral surface of the boom 41, the component support structure 8 can realize the same advantages as the piping support structure 7.

[4. Other Configurations of Piping Support]

In the above embodiment, although the piping support 71 of the piping support structure 7 and the component support 81 of the component support structure 8 have the U-shaped cutting portions substantially at the centers in the longitudinal direction of the attachment legs 712, 713 and 812, following configurations of the piping support or the component support can be employed.

Figure 11:
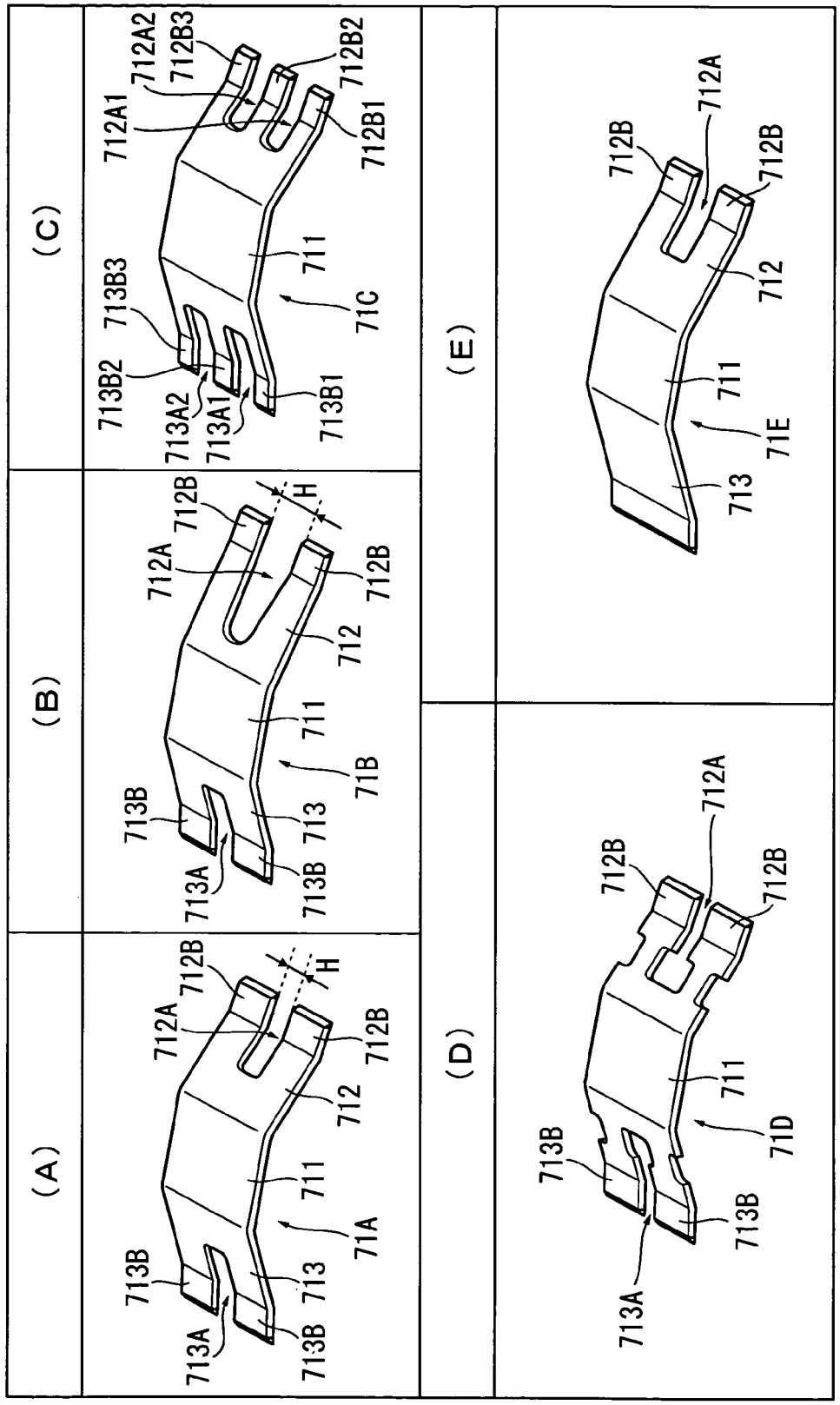
FIG. 11 is a tabular diagram showing modifications in perspective view of a component support of the component support device of the aforesaid embodiment.

Specifically, like a piping support 71A shown in a part (A) of FIG. 11, each cutting width H of the cutting portions 712A and 713A of the attachment legs 712 and 713 of the piping support 71 may be smaller than the cutting width of the above-described piping support 71 to configure the piping support 71A.

Like a piping support 71B shown in a part (B) of FIG. 11, the cutting width H of the one attachment leg 712 may gradually be formed larger toward the end of the attachment leg 712 to configure the piping support 71B.

Like a piping support 71 C shown in a part (C) of FIG. 11, two cutting portions 712A1 and 712A2 may be formed in the attachment legs 712 as well as two cutting portions 713A1 and 713A2 in the attachment legs 713, and three split legs 712B1, 712B2, 712B3 may be formed in the attachment legs 712 as well as three split legs 713B1, 713B2, 713B3 in the attachment legs 713 to configure the piping support 71C.

Like a piping support 71D shown in a part (D) of FIG. 11, the vicinities of the portions attaching to the installation portions of the split legs 712B may be enlarged in the widthdirection to configure the piping support 71D. Or, like a piping support 71E shown in a part (E) of FIG. 11, the cutting portion 712A may be formed only at the attachment leg 712 while the split legs 712B are formed only at the attachment leg 712.

As described above, since the piping supports 71A, 71B, 71C, 71D and 71E shown in FIG. 11 are respectively formed with the split legs 712B and 713B . . . at the attachment leg 712, 713, so that each area of the attachment legs 712 and 713 is reduced for lowering the rigidity, the same advantages as the piping support structure 7 can be attained even when the piping supports 71A, 71B, 71C, 71D and 71E are used for the piping support structure.

In particular, when using the piping support 71D, each area of the attachment legs 712 and 713 can effectively be reduced while each width of the split legs 712B and 713B is enlarged, thus the length for welding against the installation portion can be assured enough.

In the case of the piping support 71E, since the split legs are not provided at the attachment leg 713, the low rigidity portion is not formed on the attachment leg 713. Meanwhile, the split legs 712B are formed at the attachment leg 712 on the other side, which lowers the rigidity of the attachment leg 712. This allows to reduce the stress concentration generated between the installation portion of the attachment leg 712 and the welding portion.

[5. Modifications of Embodiment]

While the particular embodiment of the invention is described hereinbefore, the present invention is not limited thereto, and can be modified variously within the sight of this invention.

For example, the installation portion 7A of the piping support structure 7 may not be the bending portion of the boom 41, and may be other portion of the boom 41, or a portion of the arm 42 or the like. It should be appreciated that advantages such as the fatigue structure in the joint (fillet welding 76) may effectively be prevented if the piping support structure 7 is installed on the portion easily deformable.

Additionally, the tilt angles θ1 and θ2 of the attachment legs 712 and 713 can be set in an arbitrary range as long as the angles do not lower the rigidity.

With regard to the piping support 71, although the one attachment leg 712 is shorter than the other attachment leg 713, the one attachment leg 712 may contrary be shorter or may be the same length.

As for the spacing dimension (lifting dimension) between the support 711 and the installation portion 7A, the dimension can be changed by changing the tilt angles θ1 and θ2 or the lengths of the attachment legs 712 and 713.

The number of the split legs 712B and 713B of the attachment legs 712 and 713 are arbitrary, and/or the split legs may be provided only at the other attachment leg.

The split legs 712B and 713B of the attachment legs 712 and 713 may be bent at a predetermined angle relative to the support 711 as a tilt piece (tilt piece without a bending portion) without the tip end bent.

In the above embodiment, although the installation surface 721A of the base 721 of the piping attachment 72 is defined as the tilt surface and the support piece 722 supported on the upper surface of the base 721 is tilted so that the front side thereof is set at higher level than the rear side relative to the support 711 of the piping support 71, the installation surface 721A of the base 721 may not be tilted, and the support piece 722 may not be tilted relative to the support 711 of the piping support 71, or alternatively the rear side may be set at higher level than the front side.

The piping attachment 72 may be implemented with various arrangements, or may not even be provided as long as the piping can be supported by the support 711. For example, it is conceivable that a screw hole is provided directly at the support 711, and the piping components 61 and 62 are arranged between the support 711 and the metal fitting 74 to be fixed to the support 711 by screwing the screw bolt 75 or the like into the screw hole.

In the above embodiment, although the support 711 is disposed in substantially parallel to the installation portion 7A, the support 711 may tilt against the installation portion 7A.

In the above embodiment, the piping components 61, 62 and the light 5 are shown as the examples of the piping support structure 7 and the component support structure 8 as the component support device, it is not limited thereto. Equipments such as an accumulator provided at the middle of the piping of the working equipment can be supported by the component support device according to the present invention.

The piping support structure 7 may be used for a crane, a crusher, or other construction machines without limiting to the hydraulic excavator 1.

Specific configurations and profiles when implementing the present invention may be other configurations or the like as long as the object of the present invention can be attained.

The priority application Number JP2004-175059 upon which this patent application is based is hereby incorporated by reference.

What is claimed is:

1. A construction machine equipped with a working structure, a component being attached on the working structure via a component support device,
   wherein the component support device is formed by bending a plate along at least two bending lines which extend along a bending line direction, and the component support device comprises:
   a support formed at a center portion of the component support device, between the two bending lines, for supporting the component; and
   a pair of attachment legs formed on respective sides of the support to be fixed on the working structure at an installation portion of the working structure;
   wherein at least one of the pair of the attachment legs is inclined relative to the support at an oblique angle, and at least one of the pair of the attachment legs is split into a plurality of portions at a portion of the attachment leg to be fixed on the working structure;
   wherein the plurality of portions of said at least one of the pair of attachment legs are fixed on the working structure so that the bending line direction is orthogonal to a force acting direction of a force acting against the working structure;
   wherein the pair of attachment legs are welded to the working structure at the installation portion; and
   wherein a rigidity of said at least one of the pair of attachment legs, which is split into the plurality of portions, against the bending line direction is less than a rigidity of the support against the bending line direction so that when the installation portion of the working structure is deformed said at least one of the pair of attachment legs is deformed along with the installation portion.

2. The construction machine according to claim 1, wherein the plurality of portions into which said at least one of the pair of the attachment legs is split comprise a plurality of split leg pieces, and each of the leg pieces is jointed to the working structure at a position other than a position at which stress concentrates at the installation portion of the working structure.

3. The construction machine according to claim 1, wherein the working structure is a working equipment of the construction machine.

4. The construction machine according to claim 3, wherein the component comprises a piping component which is supported by the component support device and supplies pressure oil to the working equipment.

* * * * *